US010019825B2

(12) United States Patent
Li et al.

(10) Patent No.: US 10,019,825 B2
(45) Date of Patent: Jul. 10, 2018

(54) KARAOKE AVATAR ANIMATION BASED ON FACIAL MOTION DATA

(71) Applicant: Intel Corporation, Santa Clara, CA (US)

(72) Inventors: Wenlong Li, Beijing (CN); Thomas Sachson, Menlo Park, CA (US); Yunzhen Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 453 days.

(21) Appl. No.: 14/125,157

(22) PCT Filed: Jun. 5, 2013

(86) PCT No.: PCT/CN2013/076771
§ 371 (c)(1),
(2) Date: Dec. 10, 2013

(87) PCT Pub. No.: WO2014/194488
PCT Pub. Date: Dec. 11, 2014

(65) Prior Publication Data
US 2014/0361974 A1   Dec. 11, 2014

(51) Int. Cl.
*H04N 7/14* (2006.01)
*G06T 13/40* (2011.01)
(Continued)

(52) U.S. Cl.
CPC ............. *G06T 13/40* (2013.01); *G06F 3/005* (2013.01); *G06F 3/012* (2013.01); *G06F 3/017* (2013.01);
(Continued)

(58) Field of Classification Search
CPC ......... G06T 13/00; G06T 15/10; G06T 15/70; G09B 19/04; G06F 1/00; G06F 3/00;
(Continued)

(56) References Cited

U.S. PATENT DOCUMENTS 6,250,928 B1 * 6/2001 Poggio .................. G09B 19/04
345/473
2008/0100622 A1   5/2008 Gordon
(Continued)

FOREIGN PATENT DOCUMENTS

CN   101281653 A   10/2008
CN   101504774 A    8/2009
(Continued)

OTHER PUBLICATIONS

International Search Report and Written Opinion received for PCT Patent Application No. PCT/CN2013/076771 dated Mar. 6, 2014, 12 pages.
Office Action for Chinese Patent Application No. 201380076355.2, dated Sep. 22, 2017, 25 pages including 15 pages of English translation.

*Primary Examiner* — Michael Faragalla
(74) *Attorney, Agent, or Firm* — Jordan IP Law, LLC

(57) ABSTRACT

Apparatus, systems, media and/or methods may involve animating avatars. User facial motion data may be extracted that corresponds to one or more user facial gestures observed by an image capture device when a user emulates a source object. An avatar animation may be provided based on the user facial motion data. Also, script data may be provided to the user and/or the user facial motion data may be extracted when the user utilizes the script data. Moreover, audio may be captured and/or converted to a predetermined tone. Source facial motion data may be extracted and/or an avatar animation may be provided based on the source facial motion data. A degree of match may be determined between the user facial motion data of a plurality of users and the source facial motion data. The user may select an avatar as a user avatar and/or a source object avatar.

23 Claims, 5 Drawing Sheets

(51) Int. Cl.
  *G06F 3/00* (2006.01)
  *G06F 3/01* (2006.01)
  *G06F 3/03* (2006.01)
  G10L 13/00 (2006.01)
  G10L 21/013 (2013.01)
  G10L 13/033 (2013.01)
  G06K 9/00 (2006.01)

(52) U.S. Cl.
  CPC ....... *G06F 3/0304* (2013.01); *G06K 9/00315* (2013.01); *G06K 9/00335* (2013.01); *G10L 13/00* (2013.01); *G10L 13/033* (2013.01); *G10L 2021/0135* (2013.01)

(58) Field of Classification Search
  CPC ........ G06F 3/0482; G06F 3/16; G06F 3/0488; H04N 1/00
  See application file for complete search history.

(56) References Cited

U.S. PATENT DOCUMENTS

| | | | |
|---|---|---|---|
| 2010/0073361 A1 | 3/2010 | Taylor et al. | |
| 2010/0082345 A1* | 4/2010 | Wang | G10L 13/00 704/260 |
| 2012/0026174 A1 | 2/2012 | McKeon et al. | |
| 2012/0106796 A1* | 5/2012 | Jones | G06T 13/40 382/103 |

FOREIGN PATENT DOCUMENTS

| | | |
|---|---|---|
| CN | 101573733 A | 11/2009 |
| CN | 102799868 A | 11/2012 |

\* cited by examiner

KARAOKE AVATAR ANIMATION BASED ON FACIAL MOTION DATA

BACKGROUND

Embodiments generally relate to the animation of avatars. More particularly, embodiments relate to animating an avatar based on facial motion data, such as user facial motion data corresponding to one or more facial gestures observed when a user emulates a source object.

Generating an avatar animation (e.g., avatar activity, avatar action, avatar movement, etc.) may include using an apparatus having an image capture device, such as a 3D (three-dimensional) camera, to capture images of a user. The apparatus containing the image capture device may be relatively immobile during use if it is too large, if it is designed to operate from a distance, and so on. Such an apparatus may also unnecessarily waste resources (e.g., power), may not sufficiently capture user facial gestures, and/or may provide relatively low resolution capabilities to drive the animation of an avatar via user body motion data.

BRIEF DESCRIPTION OF THE DRAWINGS

The various advantages of embodiments will become apparent to one skilled in the art by reading the following specification and appended claims, and by referencing the following drawings, in which:

DETAILED DESCRIPTION

Figure 1A:
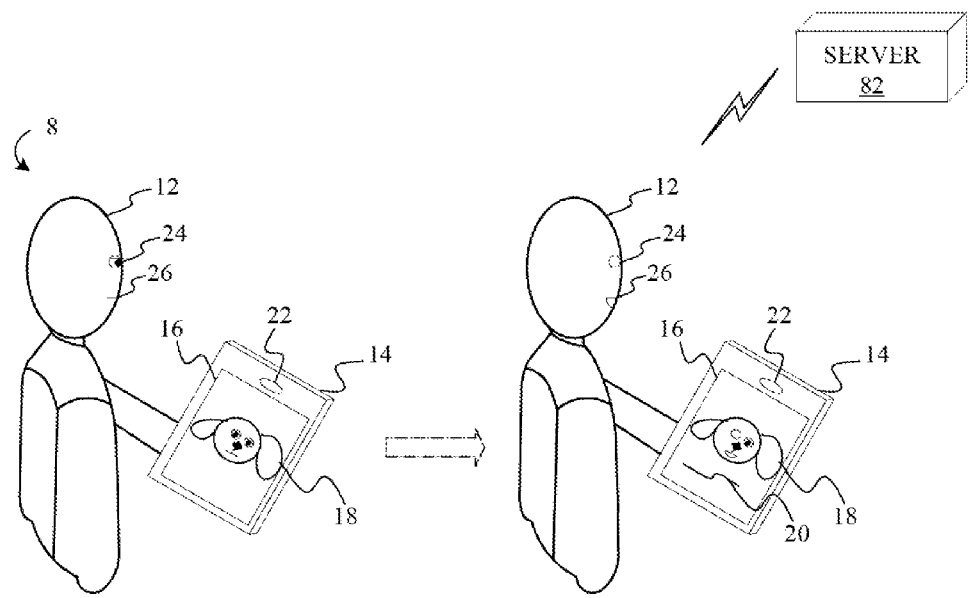
FIGS. 1A and 1B are block diagrams of example approaches to animate an avatar based on facial motion data according to an embodiment.
Figure 1B:
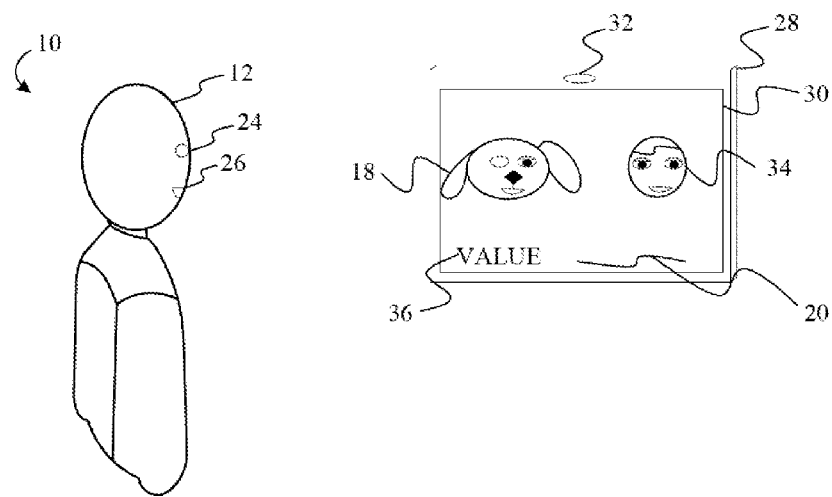

FIGS. 1A and 1B show approaches 8 and/or 10 to animate an avatar based on facial motion data according to an embodiment. In the illustrated example of FIG. 1A, a user 12 may hold an apparatus 14. The apparatus 14 may include any computing device and/or data platform such as a laptop, personal digital assistant (PDA), wireless smart phone, media content player, imaging device, mobile Internet device (MID), any smart device such as a smart phone, smart tablet, smart TV, computer server, and so on, or any combination thereof. In one example, the apparatus 14 may include a relatively high-performance mobile platform such as a notebook having a relatively high processing capability (e.g., Ultrabook® convertible notebook, a registered trademark of Intel Corporation in the U.S. and/or other countries).

The illustrated apparatus 14 includes a display 16, such as a touch screen. For example, the display 16 may be capable of receiving a touch action from the user 12, and/or may be capable of electronically processing the touch action to achieve a goal associated with the touch action (e.g., launch an application, etc.). The display 16 may also be capable of rendering data, such as an avatar 18 and/or script data 20, described below. In addition, the apparatus 14 may include an image capture device 22. In one example, the image capture device 22 may include an integrated camera of a computing device, a front-facing camera, a rear-facing camera, a rotating camera, a 2D (two-dimensional) camera, a 3D (three-dimensional) camera, a standalone camera, and so on, or combinations thereof.

The display 16 and/or the image capture device 22 may be positioned at any location. In the illustrated example of FIG. 1A, the image capture device 22 may be positioned anywhere between the user's face and the user's extended arm as the user 12 holds the apparatus 14. In another example, a standalone camera may be used that is not integrated into a computing device (e.g., a wall mounted camera), which may be in communication over a communication link with one or more displays whether or not the displays are held by the user 12. In the illustrated example of FIG. 1B, an apparatus 28 includes a display 30 and/or an image capture device 32 which is not held by the user 12 and/or which is spaced apart from the user 12 at any distance (e.g., 1 inch, 1 foot, 10 feet, etc.). It is understood that the components of the apparatus 28 may incorporate similar functionality as the components of the apparatus 16 described herein, and vice versa.

The image capture device 22 may define one or more observable areas via a field of view. In one example, one or more of the observable areas may be defined by an entire field of view, by a part of the field of view, and so on, or combinations thereof. The image capture device 22 may be operated sufficiently close enough to the user 12, and/or may include a sufficiently high resolution capability, to observe one or more user facial gestures associated with one or more user facial features in the observable area and/or the field of view. The facial features may include, for example, hair, an eyebrow, an eye, a nose, a mouth, an ear, a cheek, a chin, and so on, or combinations thereof. The facial features may also include related parts thereof, such as a bang of scalp hair, a mustache of facial hair, an eye lid of the eye, an eyeball of the eye, a tongue of the mouth, a lip of the mouth, a jaw of the chin, a dimple of a cheek, and so on, or combinations thereof. Moreover, the features may include facial props, such as eyeglasses, make-up, prosthetics, and so on, or combinations thereof.

Accordingly, at least a part of the face of the user 12 may be disposed in the observable area and/or the field of view of the image capture device 22 to observe one or more of the user facial gestures involving one or more of the facial features. Relatively subtle facial gestures (e.g., subtle facial expressions) may be observed, for example, such as the movement of an eyeball (e.g., left movement, right movement, up/down movement, rotation, etc.), a wink of an eye, a rise of an eye brow, a movement of eyeglasses, a wag of a tongue, a smile, a frown, a pucker of lips, a wiggle of a nostril, and so on, or combinations thereof. In the illustrated example, an eye 24 and/or a mouth 26 of the user 12 may be disposed in the observable area and/or the field of view of the image capture device 22, which may include a sufficiently high resolution capability to observe one or more facial gestures involving the eye 24 and/or the mouth 26.

The apparatus 14 may include a script module to present/provide the script data 20 to the user 12. The script module may derive the script data 20 from any data format, such as from a text document, a web page, a video, a movie, a still image, audio, and so on, or combinations thereof. The script module may also present the script data 20 using any format, such as a link, a text document, a web page, a video, a movie, a still image, audio, and so on, and combinations thereof. Moreover, the script module may present the script data 20 independently of the derived format, for example as a line of text when the derived format is audio, video, and so on, or combinations thereof.

The script data 20 may include performance information which may direct the actions of the user 12 in a karaoke fashion. In one example, the performance information may include verbalization data such as text for a song in a music video, text of lines of a scene in a movie, of a commercial, of a television broadcast, and so on, or combinations thereof. The performance information may also include metadata related to media content, such as rhythm information for the song, timing information for the song and/or for the lines of the scene, a description of one or more actions to be performed (e.g., walk, raise eyebrow, etc.), and so on, or combinations thereof. For example, the timing information may involve highlighting a word of text. The timing information may, in another example, involve identifying which character and/or performer is to proceed (e.g., name of a character in a play that is to speak a line of text, order of the speech, start of the speech, end of the speech, etc.).

The apparatus 14 may also include a motion module to extract facial motion data from media content. The media content may include any content format, such as a live video, recorded video, a movie, a still image (e.g., a picture, a video frame, etc.) and so on, or combinations thereof. In one example, the motion module may extract the facial motion data from a video frame. Thus, the motion module may create 32-bit floating point data for each video frame to describe a facial motion related to one or more facial gestures (e.g., facial expressions) including, for example, a mouth action, eye position, eyebrow position, a cheek motion, and so on, or combinations thereof. Accordingly, the extracted facial motion data may describe a degree of eye opening, decree of eyeball movement, degree of mouth opening, position of the lip, a nose tip, head rotation, and so on, or combinations thereof.

Additionally, the motion module may map the facial motion data to the video frame with an appropriate index. Moreover, the motion module may timestamp the facial motion data. Accordingly, the extracted facial motion data, the index information, and/or the timestamp information may be used to facilitate synchronizing one or more of the facial gestures with image content (e.g., an image in a video frame), with audio content (e.g., user audio, source object audio, etc.), with avatar content (e.g., an avatar, avatar activity, avatar action, etc.), and so on, or combinations thereof.

The motion module may extract user facial motion data that corresponds to one or more user facial gestures observed by the image capture device 22. In one example, the motion module extracts the user facial motion data when the user emulates a source object. The source object may include a source of any word and/or action that the user 12 attempts to emulate, such as a musical performer, a movie performer, a television show performer, and so on, or combinations thereof. For example, the user 12 may attempt to emulate a singer in a music video, an actor in a movie, a character (e.g., a caricature, a cartoon, etc.) in a television show, and so on, or combinations thereof.

The motion module may also extract source facial motion data that corresponds to one or more source object facial gestures. For example, the motion module may extract the source facial motion data for a singer from a music video, for a caricature from an animated movie, from a figure (e.g., a person, etc.) in a still image, and so on, or combinations thereof. The user facial motion data and/or the source facial motion data may be used immediately to animate an avatar, may be stored (e.g., in an expression database) and/or used at a later time to animate an avatar, and so on, or combinations thereof.

The user 12 may be absent from the media content, for example, from which the source facial motion data may originate. In one example, the user 12 may be absent from a music video having a source object (e.g., a singer) that the user 12 may attempt to emulate and/or that is the source of the source facial motion data. In addition, the source object may be a source of the script data 20, and/or the user 12 may be absent from the media content from which the script data 20 may originate. For example, the source object of the script data 20 may include a performer of a song in a music video (e.g., a singer) and the script data 20 may include text of the song. In another example, the source of the script data 20 may include a speaker of a line in a scene of a movie (e.g., real actor in a movie, a caricature in an animated movie, etc.) and the script data 20 may include text of the line.

The user 12 may, in one example, use the script data 20 to emulate the performance of the source object. The user 12 may, in another example, view the source object (e.g., live, a recording, etc.) and attempt to emulate a performance of the source object by speaking the words spoken by the source object during the performance, by making the facial gestures made by the source object during the performance, and so on, or combinations thereof. In the illustrated example, the user 12 may make one or more user facial gestures involving closing the eye 24 and/or opening the mouth 26 that may be observed by the image capture device 22 when the user 12 utilizes the script data 20 to emulate the source object of the script data 20.

The apparatus 14 may include an avatar module to animate an avatar based on the facial motion data. In one example, the avatar module may animate the avatar based the user facial motion data. For example, the avatar module may use the user facial motion data, the index information, and/or the timestamp information to animate the avatar 18. Thus, the user 12 may generate one or more user facial gestures involving the eye 24 (e.g., close the eye 24) and/or the mouth 16 (e.g., open the mouth 26) which causes the extraction of the user facial motion data and its use to animate avatar 18 (e.g., close an eye of the avatar 18 and/or open a mouth of the avatar 18).

In another example, the avatar module may animate an avatar based on the source facial motion data, which may include a source object of the script data 20. For example, the avatar module may use the source facial motion data, the index information, and/or the timestamp information to animate the avatar 18. Thus, the user 12 may generate one or more user facial gestures involving the eye 24 (e.g., close the eye 24) and/or the mouth 16 (e.g., open the mouth 26) in an attempt to emulate the source object, wherein the source facial motion data may be used to animate the avatar 18 (e.g., close an eye of the avatar 18 and/or open a mouth of the avatar 18 when the script data 20 is provided), and which causes the extraction of the user facial motion data and its use to animate another avatar for the user 12.

In addition, the avatar module may provide an avatar that is manually selected by the user 12, automatically selected by the avatar module, and so on, or combinations thereof. In one example, the avatar may be selected by the user 12 via a user interface (e.g., a graphical user interface, a command line interface, etc.). The avatar selected by the user 12, for example, may be utilized as a user avatar. Thus, when the user 12 generates one or more user facial gestures, the avatar 18 may be driven based on the user facial motion data if the user selects the avatar 18 to be utilized as the user avatar.

The avatar selected by the user 12 may also be utilized as a source object avatar. Thus, the avatar 18 may be driven based on the source object motion data if the user 12 selects the avatar 18 to be utilized as the source object avatar.

The user 12 (and/or the avatar module) may select any avatar to represent the user 12, other users, and/or the source object. In one example, the user 12 may select a 2D image (e.g., picture, caricature representation, etc.) of the user 12 as the source object avatar, may select a 3D image of the source object (e.g., 3D picture of the source object, a 3D caricature representation of the source object, etc.) as the avatar of the user 12, and so on, or combinations thereof. In another example, the user 12 may select the same representation to be utilized as the both the user avatar and the source object avatar.

The apparatus 14 may include a tone module to recognize audio. In one example, the tone module may recognize user audio captured by an audio capture device. The audio capture device may include an integrated microphone of a computing device, a front-facing microphone, a rear-facing microphone, a standalone microphone, and so on, or combinations thereof. In addition, the audio capture device may be positioned at any location. For example, a standalone microphone may be used that is not integrated into a computing device (e.g. a hand-held standalone microphone), which may be in communication over a communication link with the apparatuses 16, whether or not the apparatus 16 is held by the user 12. The user audio may be generated, for example, by a verbalization of the script data 20 wherein the script data 20 may include text data that may be presented to the user 12. The tone module may also recognize source object audio, for example from a recording, from a broadcast stream (e.g., a video stream), from a database, and so on, or combinations thereof.

In addition, the tone module may convert the user audio and/or the source object audio to a predetermined tone. For example, the tone module may transform the user audio into a specified avatar tone using techniques such as pitch shifting, wherein the user may establish the type of pitch shifting to be applied. Accordingly, the user 12 may select their own tone (e.g., the user's voice tone) as the source object avatar tone, may select the source object tone (e.g., the source object's voice tone) as the user avatar tone, may select a tone representative of an avatar type (e.g., a frog tone for a frog avatar type) for the user avatar tone and/or the source object avatar tone, and so on, or combinations thereof. Accordingly, tone data may include the user audio, the source object audio, the predetermined tone, the avatar tone, any information related to the tone, and so on, or combinations thereof.

The apparatus 14 may include a match module to analyze a degree of match between the user facial motion data and the source facial motion data. In one example, the match module may use the facial motion data, the index information, and/or the timestamp information of the user and the source object to determine the degree of match. The match module may also assign a value based on the degree of match. In one example, the value may include a score based on a match percent (e.g., 99% match, 95% match, etc.), a score based on points, and so on, or combinations thereof.

The points may, in one example, be based on a closeness in rhythm (e.g., a point for every note in rhythm, etc.), a successful verbalization of a word (e.g., a point for every successful verbalization of a word), a successful execution of a facial gesture (e.g., two points for every smile match, a point for every wink match, points for prop matches, etc.), and so on, or combinations thereof. In the illustrated example of FIG. 1B, the user 12 may observe a value 36 which may based on the degree of match between the user facial motion data (e.g., used to drive the action of the avatar 18 if selected to be utilized as the user avatar) and the source facial motion data (e.g., used to drive the action of an avatar 34 if selected to be utilized as the source object avatar). For example, the value 36 may include points gained for successfully opening the mouth 16 and/or points lost for closing the eye 14.

The match module may also determine a degree of match between each of a plurality of user facial motion data (e.g., from each of a plurality of users) and the source facial motion data. In addition, the match module may assign values to each of the users (e.g., to each of the plurality of users) based on their respective degrees of match. The match module may parse the values according to a predetermined parameter, such as according to sections of the media content (e.g., value for first two minutes versus last two minutes). The match module may use the values alone, may combine the values with prior values to calculate one or more total values for each user (e.g., total value for a session, for a song, etc.), may combine the values to calculate one or more total group values for a group of users (e.g., total group values for a chorus), and so on, or combinations thereof. Accordingly, match data may include the degree of match, the values, any information related to the match, and so on, or combinations thereof.

The apparatus 14 may include a compilation module to combine a plurality of avatar animations for a plurality of avatars (e.g., from a plurality of users) into a single media content. In one example, the compilation module may combine an avatar animation corresponding to a plurality of avatars into the same media content, such as combining two or more user avatars driven by respective user facial motion data into the same video clip. For example, two or more users may attempt to reproduce a scene of a movie, where each of the users may emulate different performers in the scene. The compilation module may combine an avatar animation from the two or more users into a same video clip to reproduce the scene. The two or more users may, as another example, attempt to reproduce a scene of a movie where each of the users may emulate the same performer in the scene, wherein the compilation module may provide a choice to select the user avatar based on a predetermined parameter, such as the best values for the avatar animations.

The compilation module may also facilitate the render of each of the avatar animations, such as a side-by-side rendering, rendering on different platforms, rendering in parallel, rendering sequentially, and so on, or combinations thereof. The compilation module may automatically choose and/or provide a combination of the avatars into the single media content based on a predetermined parameter, such as a setting for the best value, a user preference for split-screen parallel rendering, and so on, or combinations thereof. In addition, the compilation module may combine the source object avatar with one or more user avatars into the single media content. Accordingly, compilation data may include the avatars combined, the avatar animations combined, the rendering possibilities, any information related to the compilation, and so on, or combinations thereof.

The media content that includes one or more avatar animations may be recorded and/or stored. In one example, the media content may be stored via a data store and/or memory of the apparatus 14. The media content may, in another example, be stored on the server 82, which may be located at the same and/or different physical location as the apparatus 14. In addition, the media content including one or more avatar animations may be rendered. For example, the media content may be rendered on the display 16. In another example the media content may be rendered on one or more other displays, such as on respective displays of one or more of a plurality of users associated with the avatar animations (e.g., displays of respective users that generated user facial motion data).

The media content including one or more avatars may, in a further example, be rendered on a display of one or more users of an online social community (e.g., FACEBOOK®, TWITTER®, LINKEDIN®, registered trademarks of Facebook, Twitter, and Linkedin, respectively). The media content including one or more avatars may be rendered by any manner, such as by providing a copy of the media content (e.g., a copy of a video clip including a combination of avatar animation), by providing a link to the media content (e.g., a link to a web site having the video clip), by providing a secure access to the media content (e.g. secure access to a shared environment having the video clip), and so on, or combinations thereof.

Additionally, it is understood that the server 82 may provide one or more of the functionalities discussed for the apparatus 14 (and/or 28). For example, the server 82 may receive live video from the image capture device 22 and provide avatar data (e.g., the avatar 18, the avatar 34, the avatar animation, etc.) to the apparatus 14 to be rendered on the display 16. The apparatus 14, in another example, may extract and forward motion data (e.g., body motion data, facial motion data, etc.) to an avatar module of the server 82 over a communication network (e.g., WiFi/Wireless Fidelity, Ethernet, CDMA/Code Division Multiple Access, etc.), and receive avatar data to render the avatar 18 on the display 16. The communication between the apparatus 14 and/or the server 82 may be in real-time (e.g., live), on a delayed basis (e.g., from storage), and so on, or combinations thereof.

Thus, in one example, the extracted user facial motion data and/or source facial motion data may be used immediately to animate an avatar, may be stored and used on playback to animate an avatar, and so on, or combinations thereof. In one example, the source object may include a singer and the media content may include a music video, wherein playback of the music video for the user 12 may cause currently extracted and/or previously extracted and stored singer facial motion data corresponding to the video to animate the singer avatar (e.g., watch the singer's avatar sing the song) at the same time that the user 12 attempts to sing the same song. The user 12 may select an avatar for himself, for other users, for the singer, and so on, or combinations thereof. In addition, the user may view their own avatar mimicking their own facial gestures based on the user facial motion data.

The singer's avatar and the user avatar may be displayed side-by-side, for example, wherein the user facial motion data that is extracted may be used to animate the user avatar as the user 12 is singing the song. Thus, the user 12 may correct their movements to more closely mimic the facial movements of the singer which may be driven by the source facial motion data. The user facial motion data of the user 12, however, may also be stored and used at a later time to animate an avatar, for example when a video clip having the animated user avatar is shared and played in a social network. The user may be provided with script data, such as words of the song, timing information, and so on, or combinations thereof. In addition, the tone of the user avatar may be selected (e.g., to be the tone of the singer), the avatar animations of multiple users (and/or of source singers) may be combined into a single video clip, may be accessed by multiple users (e.g., posted, forwarded, etc.), may be compared, may be assigned values, and so on, or combinations thereof. Thus, a karaoke avatar solution may be provided that supports the recognition and scoring of facial gestures of multiple users in a real-time setting.

Figure 2:
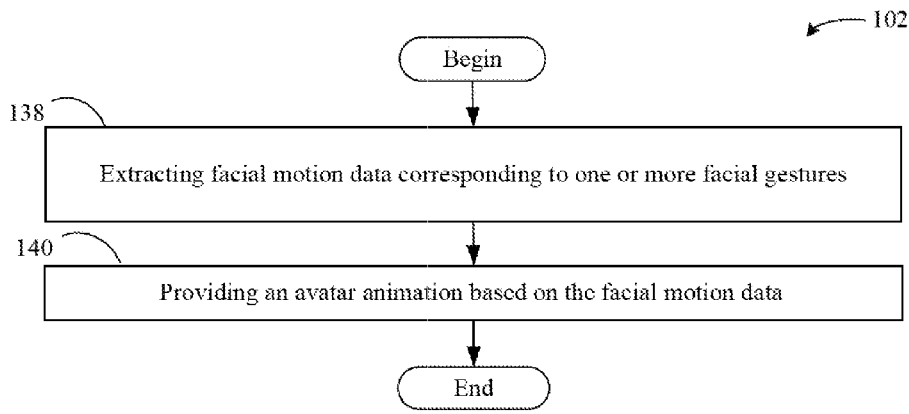
FIG. 2 is a flowchart of an example of a method to animate an avatar based on facial motion data according to an embodiment.

Turning now to FIG. 2, a method 102 is shown to animate an avatar based on facial motion data according to an embodiment. The method 102 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 102 may be written in any combination of one or more programming languages, including an object oriented programming language such as C++ or the like and conventional procedural programming languages, such as the "C" programming language or similar programming languages. Moreover, the method 102 may be implemented using any of the herein mentioned circuit technologies.

Illustrated processing block 138 provides for extracting facial motion data corresponding to one or more facial gestures. One or more facial gestures may be associated with one or more facial features such as hair, an eyebrow, an eye, a nose, a mouth, an ear, a cheek, a chin, parts thereof such as a bang of scalp hair, a mustache of facial hair, an eye lid of the eye, a tongue of the mouth, a lip of the mouth, a jaw of the chin, a dimple of a cheek, facial props, such as eyeglasses, make-up, prosthetics, and so on, or combinations thereof. In one example, relatively subtle facial gestures (e.g., subtle facial expressions) may be observed to extract the facial motion data involving one or more of the facial features, such as a wink of an eye, a movement of an eyeball, a rise of an eye brow, a movement of eyeglasses, a wag of a tongue, a smile, a frown, a pucker of lips, a wiggle of a nostril, and so on, or combinations thereof.

Additionally, extracting the facial motion data at the block 138 may include using an image capture device to observe one or more of the user facial gestures. The image capture device may include an integrated camera of a computing device, a front-facing camera, a rear-facing camera, a rotating camera, a 2D camera, a 3D camera, a standalone camera, and so on, or combinations thereof. Accordingly, in one example, at least a part of a face of the user may be disposed in an observable area and/or a field of view of the image capture device (e.g., a camera of a mobile platform) to observe one or more of the user facial gestures and facilitate the extraction of the facial motion data.

Additionally, extracting the facial motion data at the block 138 may include extracting user facial motion data and/or source facial motion data. The facial motion data may describe a degree of eye opening, degree of eyeball movement, degree of mouth opening, position of the lip, a nose tip, head rotation, and so on, or combinations thereof. Thus, the user facial motion data may correspond to a user facial gesture by, for example, describing a degree of motion (e.g., degree of eye opening) related to the user facial gesture. In addition, the source facial motion data may correspond to a source object facial gesture, wherein the source object may include a source of any word and/or action that the user attempts to emulate. For example, the user may attempt to emulate a performer (e.g., a singer) in the media content (e.g., a music video), a performer (e.g., an actor) in the media content (e.g., a movie), a character (e.g., a caricature, a cartoon, etc.) in the media content (e.g., a television show), and so on, or combinations thereof. In addition, the facial motion data may be extracted from any content. In one example, the facial motion data may be extracted from a live video, recorded video, a movie, a still image (e.g., a picture, a video frame, etc.), and so on, or combinations thereof.

Additionally, extracting the facial motion data at the block 138 may include extracting at least the user facial motion data when the user emulates a source object. In one example, script data may be provided to the user and the user facial motion data may be extracted when the user utilizes the script data (e.g., access the script data, views the script data, verbalizes the script data, is provided the script data, etc.). The script data may include performance information to direct the actions of the user. The performance information may include, for example, verbalization data, metadata related to media content, and so on, or combinations thereof. Accordingly, the user may use the script data to emulate the performance of the source object.

Additionally, extracting the facial motion data at the block 138 may include extracting at least user facial motion data when the user emulates the source object. In one example, the user facial motion data may be extracted when the user views the source object and attempts to emulate a performance of the source object, such as by speaking the words spoken by the source object during the performance. The source facial motion data may be extracted, however, from the media content and stored for later use independently of when the user is to emulate the source object, such as when the source facial motion data is extracted from the recorded video and retrieved from a data store (e.g., an expression database) when the user is to emulate the source object. In addition, the user may be absent from the media content from which the source facial motion data and/or the script data may originate. For example, the user may be absent from a video from which the source facial motion data and/or the script data may originate.

Illustrated processing block 140 involves animating an avatar based on the facial motion data. For example, the user facial motion data, the index information, and/or the timestamp information may be used to animate an avatar (e.g., to animate a user avatar, a source object avatar, etc.). In another example, the source facial motion data, the index information, and/or the timestamp information may be used to animate an avatar (e.g., to animate a user avatar, a source object avatar, etc.). In addition, the source facial motion data may correspond to the source object of the script data.

Additionally, animating the avatar at the block 140 may include providing and/or identifying one or more avatars. For example, one or more avatars may be manually selected by the user, automatically selected, and so on, or combinations thereof. In addition, one or more avatars may be utilized as a user avatar, as a source object avatar, and so on, or combinations thereof. For example, the avatar provided and/or selected may include an image of the source object (e.g., 2D image, 3D image, a caricature representation, etc.).

Additionally, animating the avatar at block 140 may include recognizing audio, such as user audio and/or source object audio. The user audio may be generated, for example, by a verbalization of the script data wherein the script data may include text data that may be presented to the user. The source object audio may be recognized from storage, from a recording, from a broadcast stream (e.g., a video stream), and so on, or combinations thereof. Moreover, animating the avatar at block 140 may include converting the user audio and/or the source object audio to a predetermined tone. For example, the user audio and/or the source object audio may be transformed into a specified avatar tone using techniques such as pitch shifting, wherein the user may establish the type of pitch shifting to be applied.

Additionally, animating the avatar at block 140 may include analyzing a degree of match between the user facial motion data and the source facial motion data. In one example, the facial motion data, the index information, and/or the timestamp information for each user and source object may be used to determine the degree of match. Moreover, animating the avatar at block 140 may include assigning a value based on the degree of match, for example assigning a score based on a match percent, a score based on points, and so on, or combinations thereof. The degree of match between each of a plurality of user facial motion data (e.g., from each of a plurality of users) and the source facial motion data may be determined to assign values to each of the users (e.g., to each of the plurality of users) based on their respective degrees of match.

Additionally, animating the avatar at block 140 may include combining a plurality of avatar animations of a plurality of avatars (e.g., from a plurality of users) into a single media content. In one example, an avatar animation of a plurality of avatars may be combined into the same media content, such as where two or more user avatars driven by respective user facial motion data may be combined into the same media content (e.g., combined into the same video clip). In addition, animating the avatar at block 140 may include providing a choice to the user to select the user avatar based on a predetermined parameter, such as the best values for the avatar animations. Moreover, animating the avatar at block 140 may include facilitating the render the avatar animations, such as a side-by-side rendering, a rendering on different platforms, rendering in parallel, rendering sequentially, and so on, or combinations thereof. The combination of two or more avatars may be automatically selected and/or provided based on a predetermined parameter, such as a setting for the best value, a user preference for split screen parallel rendering, and so on, or combinations thereof. In addition, animating the avatar at block 140 may include combining the source object avatar with one or more user avatars into the single media content.

Additionally, animating the avatar at block 140 may include displaying one or more avatar animations. In one example, the media content generated that includes one or more avatar animations may be displayed on a screen of a mobile platform (e.g., a notebook), may be displayed on a screen of a platform that is spaced apart from the user (e.g., wall-mounted smart TV), and so on, or combinations thereof. In addition, the media content generated that includes one or more avatar animations may be rendered on one or more other displays, such as on respective displays of one or more of a plurality of users associated with the avatar animations (e.g., displays of users that generated user facial motion data), on displays of one or more users of an online social community, and so on, or combinations thereof.

The media content generated that includes one or more avatar animations may be rendered by providing a copy of the media content (e.g., forwarding a copy of the video clip), may be rendered via a link to the media content (e.g., a link to a web site), may be rendered via a secure access to the media content (e.g. secure access to a shared environment), and so on, or combinations thereof. The media content generated that includes one or more avatar animations may also be stored via a data store and/or memory, for example in communication with the mobile platform. The media content generated that includes one or more avatar animations may further be stored on a server which may be located at the same and/or different physical location as the display rendering the avatar animation.

Figure 3:
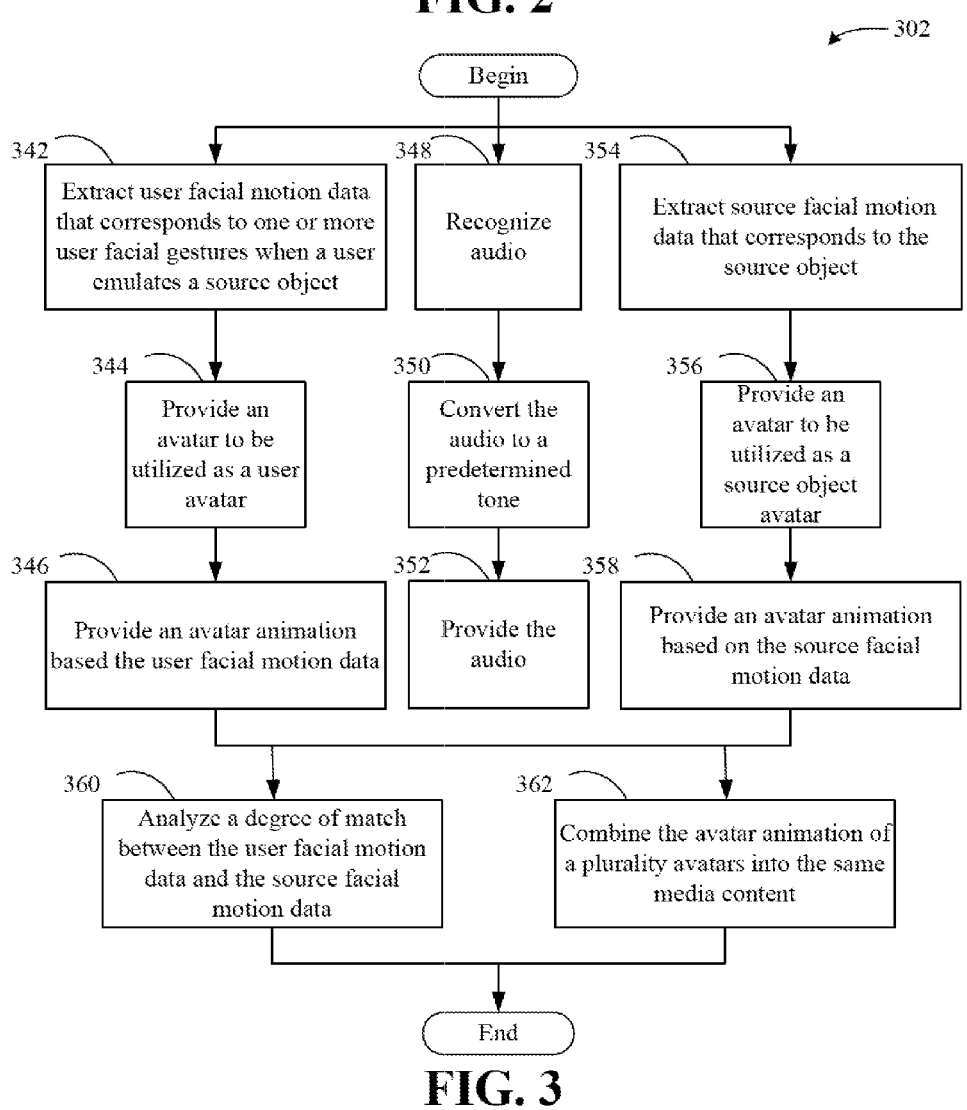
FIG. 3 is a flowchart of an example of a method to animate an avatar based on facial motion data according to an embodiment.

FIG. 3 shows a flow of a method 302 to animate an avatar based on facial motion data according to an embodiment. The method 302 may be implemented using any of the herein mentioned technologies. Illustrated processing block 342 may extract user facial motion data that corresponds to one or more user facial gestures when a user emulates a source object. The user facial motion data may correspond to a user facial gesture by, for example, describing a degree of motion (e.g., degree of eye opening, etc.) related to the user facial gesture. In one example, script data may be provided to the user and the user facial motion data (e.g., degree of mouth movement, etc.) may be extracted when the user utilizes the script data to emulate the source object. In another example, an image capture device such as a camera of a mobile platform may observe the user facial gestures (e.g., in a visual field thereof) to facilitate the extraction of the user facial motion data.

Additionally, an avatar may be provided at block 344 which may be utilized as a user avatar. The user avatar may be selected by the user, may be automatically assigned, and so on, or combinations thereof. The avatar may include an image (e.g. 2D, 3D, etc.) of the user, an image of a source object (e.g., a source object of the script data), an image of another entity (e.g., an image of another real person, of a caricature, etc.) and so on, or combinations thereof. An avatar animation may be provided based on the user facial motion data at block 346. For example, the user facial motion data, index information, and/or timestamp information may be used to animate an avatar (e.g., to animate the user avatar, etc.).

Illustrated processing block 348 recognizes audio. In one example, the audio may include user audio, source object audio, background audio, and so on, or combinations thereof. For example, the user audio may be generated by a verbalization of the script data, wherein the script data may include text data that may be presented to the user. In another example, the source object audio may be recognized from a recording, from a broadcast stream (e.g., a video stream), from an audio file, from a compact disc, and so on, or combinations thereof. The audio may be converted to a predetermined tone at block 350. For example, the user audio may be transformed into a specified user avatar tone (e.g., the user avatar may include the tone of the source object, a reduced noise version of the user tone, etc.). In another example, the source object audio may be transformed into a specified source object avatar tone (e.g., the source object avatar may include the tone representative of a character type, etc.). The audio may be provided at block 352, for example simultaneously with one or more of the avatar animations.

Illustrated processing block 354 extracts source facial motion data that corresponds to the source object, wherein the source object may include a source of any word and/or action that the user attempts to emulate. In addition, the source object may be a source of the script data. Thus, the source facial motion data may be extracted when the user attempts to emulate a performer of the media content (e.g., emulate a singer of a music video using the script data), may be extracted and stored for use when the user attempts to emulate the performer, may be extracted and placed in an expression database for gestures associated with the performer and/or the specific media content (generally for the performer and/or for the performer in the specific media content), and so on, or combinations thereof. In addition, the source facial motion data may be extracted from media content in which the user is absent, such as a streaming music video, an animated movie, and so on, or combinations thereof. Thus, the source object may include a performer in the media content (e.g., actor in a movie), a character in the media content (e.g., a caricature in a television show), and so on, or combinations thereof.

Additionally, an avatar may be provided at block 356 which may be utilized as a source object avatar. The user avatar may be selected by the user, may be automatically assigned, and so on, or combinations thereof. The source object avatar may include an image (e.g., 2D, 3D, etc.) of the user, an image of a source object, an image of another entity (e.g., an image of another real person, of a caricature, etc.), and so on, or combinations thereof. An avatar animation may be provided based on the source facial motion data at block 358. For example, the source facial motion data, index information, and/or timestamp information may be used to animate an avatar (e.g., to animate the source object avatar, etc.).

Illustrated processing block 360 may analyze a degree of match between user facial motion data and the source facial motion data. In one example, the facial motion data, the index information, and/or the timestamp information for the user and the source object may be used to determine the degree of match. In addition, a value may be assigned based on the degree of match. Moreover, the degree of match between each of a plurality of user facial motion data (e.g., from each of a plurality of users) and the source facial motion data may be determined to assign values to each of the users (e.g., to each of type plurality of users) based on their respective degrees of match. In addition, the respective degrees of match may be determined, compared, combined, parsed, rendered, stored, and so on, or combinations thereof.

Illustrated processing block 362 may combine a plurality of avatar animations of a plurality of avatars (e.g., from a plurality of users) into a single media content. For example, two or more user avatars driven by respective user facial motion data may be combined into the same media content (e.g. combined into the same video clip). A choice may be provided to the user to select the user avatar based on a predetermined parameter. Also, a render for each of the avatar animations may be facilitated, for example by defining parallel display, sequential display, simultaneous display, and so on, or combinations thereof. Two or more avatars (and/or avatar animations) may also be automatically selected and/or provided based on a predetermined parameter. In addition, the source object avatar may be combined with one or more user avatars into the single media content. Moreover, the media content generated including one or more of the avatar animations may be recorded, stored, and/or displayed in real-time, on a delayed basis, and so on, or combinations thereof.

Figure 4:
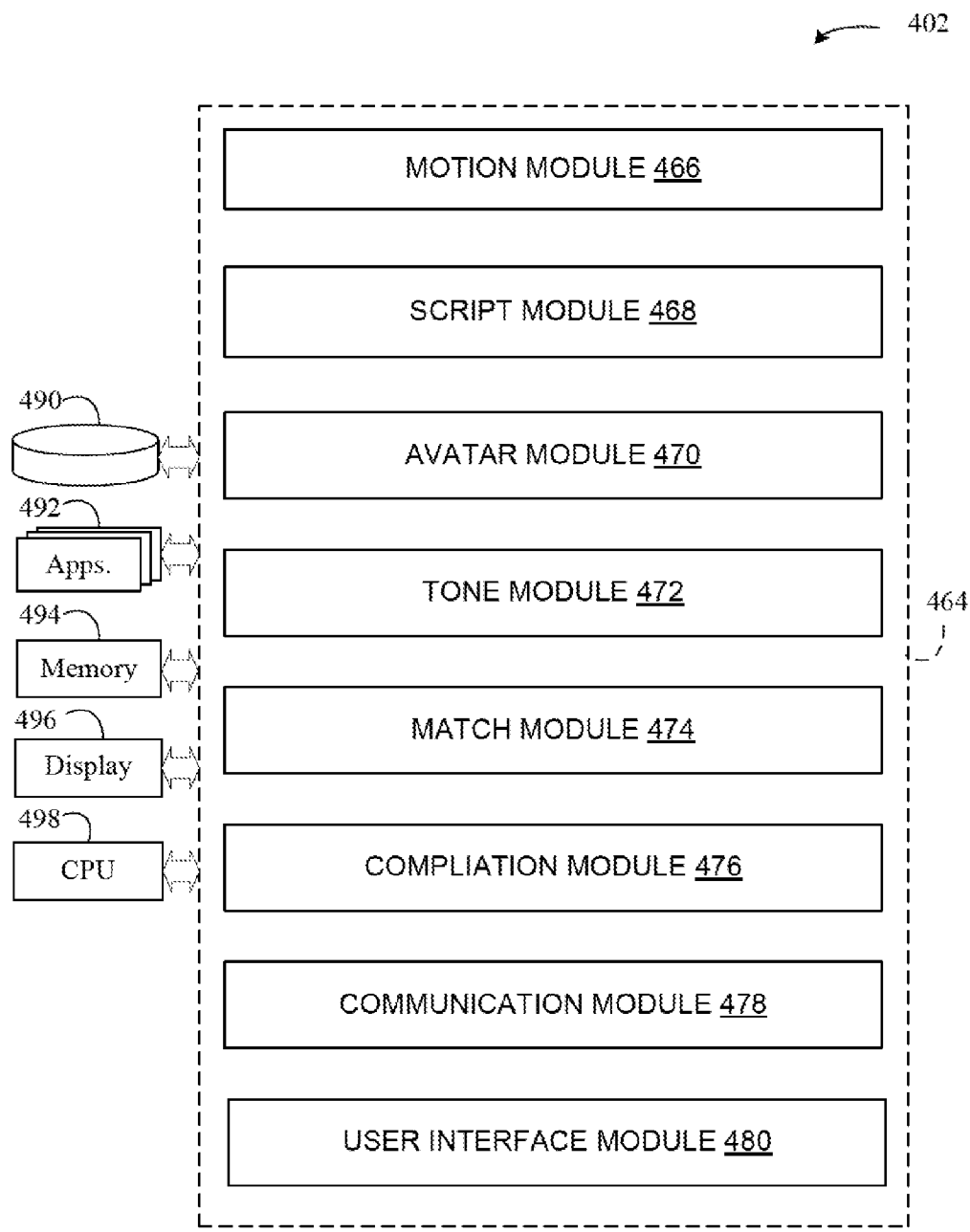
FIG. 4 is a block diagram of an example of a logic architecture according to an embodiment.

Turning now to FIG. 4, an apparatus 402 is shown including logic 464 to animate an avatar based on facial motion data according to an embodiment. The logic architecture 464 may be generally incorporated into a platform such as such as a laptop, personal digital assistant (PDA), wireless smart phone, media player, imaging device, mobile Internet device (MID), any smart device such as a smart phone, smart tablet, smart TV, computer server, and so on, or combinations thereof. The logic architecture 464 may be implemented in an application, operating system, media framework, hardware component, and so on, or combinations thereof. The logic architecture 464 may be implemented in any component of an avatar animation pipeline, such as a network interface component, memory, processor, hard drive, operating system, application, and so on, or combinations thereof. For example, the logic architecture 464 may be implemented in a processor, such as a central processing unit (CPU), a graphical processing unit (GPU), a visual processing unit (VPU), a sensor, an operating system, an application, and so on, or combinations thereof. The apparatus 402 may include and/or interact with storage 490, applications 492, memory 494, display 496, CPU 498, and so on, or combinations thereof.

In the illustrated example, the logic architecture 464 includes a motion module 466 to extract facial motion data from media content. The motion module 466 may extract user facial motion data that corresponds to one or more user facial gestures, source facial motion data that corresponds to one or more source objects, and so on, or combinations thereof. In one example, the motion module 466 may create 32-bit floating point data for a video frame to describe a facial motion related to one or more facial gestures (e.g., facial expressions) involving, for example, a mouth action, eye position, eyebrow position, a cheek motion, and so on, or combinations thereof. Accordingly, the extracted facial motion data may describe a degree of eye opening, degree of mouth opening, position of the lip, a nose tip, head rotation, and so on, or combinations thereof.

In addition, the motion module 466 may map the facial motion data to the media content with an appropriate index. The motion module 466 may also timestamp the facial motion data. Thus, the facial motion data, the index information, and/or the timestamp information may be used to facilitate synchronizing one or more of the facial gestures with image content (e.g., an image in a video frame), with audio content, with an avatar content (e.g., an avatar, avatar activity, avatar action, etc.), and so on, or combinations thereof. The motion module 466 may extract facial motion data when the user emulates the source object, may store extracted facial motion data for later user, and so on, or combinations thereof.

Additionally, the illustrated logic architecture 464 may include a script module 468 to provide script data to the user. The script module 468 may derive the script data from any data format, such as from a text document, a web page, a video, a movie, a still image, audio, and so on, or combinations thereof. The script module 468 may provide the script data in any format, such as a link, text, video, images, and so on, or combinations thereof. The script data provided by the script module 468 may include performance information to direct the actions of the user. For example, the script module 468 may provide performance information including verbalization data (e.g., text for a song in a music video), metadata related to media content (e.g., rhythm information, timing information, action description information, etc.), and so on, or combinations thereof.

Additionally, the illustrated logic architecture 464 may include an avatar module 470 to animate an avatar based on the facial motion data. In one example, the avatar module 470 may animate the avatar based the user facial motion data. For example, the avatar module 470 may use the user facial motion data, the index information, and/or the timestamp information to animate a user avatar, a source object avatar, and so on, or combinations thereof. In another example, the avatar module 470 may animate an avatar based on the source facial motion data. The avatar module 470 may, for example, use the source facial motion data, the index information, and/or the timestamp information to animate the user avatar, the source object avatar, and so on, or combinations thereof. In addition, the avatar module 470 may provide an avatar selected by the user, may automatically select the avatar, and so on, or combinations thereof. In one example, the avatar selected may be utilized as the user avatar, as the source object avatar (which may be the same representations, variations of the same representations, etc.), and so on, or combinations thereof.

Additionally, the illustrated logic architecture 464 may include a tone module 472 to recognize audio. In one example, the tone module may recognize user audio, source object audio, background audio, and so on, or combinations thereof. The user audio recognized by the tone module 472 maybe generated, for example, by a verbalization of the script data wherein the script data may include text data that may be presented to the user. The tone module 472 may also convert the user audio and/or the source object audio to a predetermined tone. For example, the tone module 472 may transform the audio into a specified avatar tone (e.g., a user avatar tone, a source object avatar tone, etc.) using techniques such as pitch shifting, wherein the user may establish the type of pitch shifting to be applied.

Additionally, the illustrated logic architecture 464 may include a match module 474 to analyze a degree of match between user facial motion data and the source facial motion data. In one example, the match module 474 may use the facial motion data, the index information, and/or the timestamp information for the user and the source object to determine the degree of match. In addition, the match module 474 may assign a value based on the degree of match. Moreover, the match module 474 may determine and/or compare the degree of match between each of a plurality of user facial motion data (e.g., from each of a plurality of users) and the source facial motion data. The match module 474 may also choose the appropriate avatar animation and/or assign values to each of the users (e.g., to each of the plurality of users) based on their respective degrees of match. Accordingly, the match module 474 may determine, compare, combine, parse, render, and/or store respective degrees of match, associated values, and so on, or combinations thereof.

Additionally, the illustrated logic architecture 464 may include a compilation module 476 to combine a plurality of avatar animations into a single clip, recording and/or file of media content. In one example, the compilation module 476 may combine an avatar animation of a plurality of avatars into the same media content, such as combining two or more user avatars driven by respective user facial motion data into the same media content. The compilation module 476 may provide a choice to the user to select the user avatar based on a predetermined parameter. Also, the compilation module 476 may facilitate a render of each of the avatar animations, for example a parallel rendering, a sequential rendering, and so on, or combinations thereof. The compilation module 476 may select and/or provide two or more avatars (and/or animations thereof) automatically based on a predetermined parameter. In addition, the compilation module 476 may provide the source object avatar and one or more user avatars in the single media content.

Additionally, the illustrated logic architecture 464 may include a communication module 478. The communication module may be in communication and/or integrated with a network interface to provide a wide variety of communication functionality, such as cellular telephone (e.g. W-CDMA (UMTS), CDMA2000 (IS-856/IS-2000), etc.), WiFi, Bluetooth (e.g., IEEE 802.15.1-2005, Wireless Personal Area Networks), WiMax (e.g., IEEE 802.16-2004), Global Positioning Systems (GPS), spread spectrum (e.g., 900 MHz), and other radio frequency (RF) telephony purposes. The communication module 478 may communicate any data associated with an avatar animation, including motion data, avatar data, script data, tone data, match data, compilation data, and so on, or combinations thereof. For example, the communication module 478 may communicate the media content including a plurality of avatar animations to one or more of a plurality of users associated with the avatar animations, one or more users of an online social community, and so on, or combinations thereof.

Additionally, any data associated with an avatar animation may be stored in the storage 490, may be displayed in via the applications 492, may be stored in the memory 494, may be displayed in the display 496, and/or may be implemented via the CPU 498. For example, motion data (e.g., facial motion data, index information, timestamp information, etc.), avatar data (e.g., a user avatar, a source object avatar, animations thereof, etc.), script data (e.g., verbalization data, metadata, etc.), tone data (e.g., a user tone, a source object tone, avatar tones, etc.), match data (e.g., values, etc.), compilation data (e.g., combinations, renderings, etc.), and/or the communication data (e.g., communication settings, etc.) may be stored, displayed, and/or implemented using the storage 490, the applications 492, the memory 494, the display 496, the CPU 498, and so on, or combinations thereof.

Additionally, the illustrated logic architecture 464 may include a user interface module 480. The user interface module 480 may provide any desired interface, such as a graphical user interface, a command line interface, and so on, or combinations thereof. The user interface module 480 may provide access to one or more settings associated with an avatar animation. The settings may include options to define, for example, motion data parameters (e.g., types of facial motion data, facial gestures, facial features, etc.), parameters to recognize facial gestures (e.g., resolution, etc.), one or more image capture devices (e.g., select a camera, etc.), one or more fields of view (e.g., visual field), one or more observable areas (e.g., part of the field of view), one or more displays (e.g., mobile platforms, community member displays, etc.), script data (e.g., derived formats, rendered formats, etc.), match parameters (e.g., values, etc.), avatar parameters (e.g., user avatar, source object avatar, etc.), tone parameters (e.g., avatar tone, etc.) compilation parameters (e.g., number of avatars to group, side-by-side rendering, appropriate avatars to group in combinations, etc.), communication and/or storage parameters (e.g., which data to store, where to store the data, which data to communicate, etc.). The settings may include automatic settings (e.g., automatically provide avatar animation based on match percent), manual settings (e.g., request the user to manually select and/or confirm avatar animation, user in the social community, etc.), and so on, or combinations thereof.

While examples have shown separate modules for illustration purposes, it is should be understood that one or more of the modules of the logic architecture 464 may be implemented in one or more combined modules, such as a single module including one or more of the motion module 466, the script module 468, the avatar module 470, the tone module 472, the match module 474, the compilation module 476, the communication module 478, and/or the user interface module 480. In addition, it should be understood that one or more logic components of the apparatus 402 may be on platform, off platform, and/or reside in the same or different real and/or virtual space as the apparatus 402. For example, motion module 468 may reside in a computing cloud environment on a server while one or more of the other modules of the logic architecture 464 may reside on a computing platform where the user is physically located, and vice versa, or combinations thereof.

Figure 5:
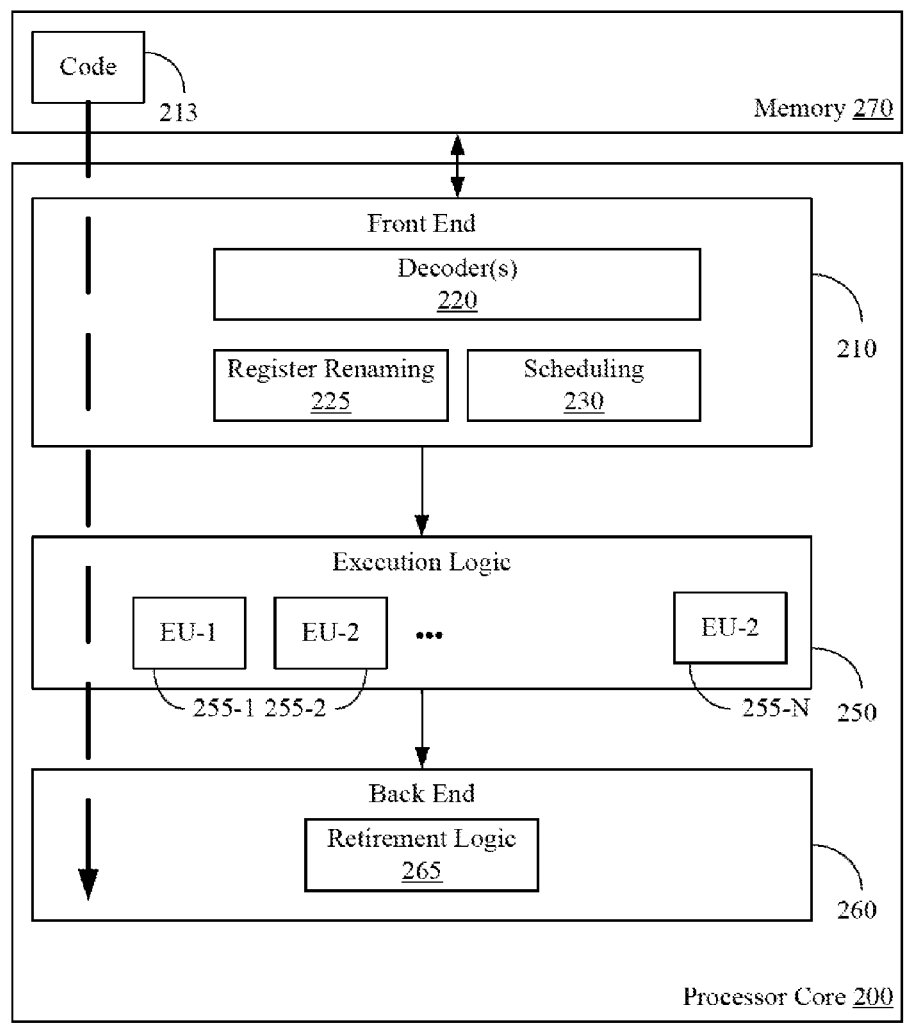
FIG. 5 is a block diagram of an example of a processor according to an embodiment.

Turning now to FIG. 5, a processor core 200 according to one embodiment is shown. The processor core 200 may be the core for any type of processor, such as a micro-processor, an embedded processor, a digital signal processor (DSP), a network processor, or other device to execute code to implement the technologies described herein. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 464 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
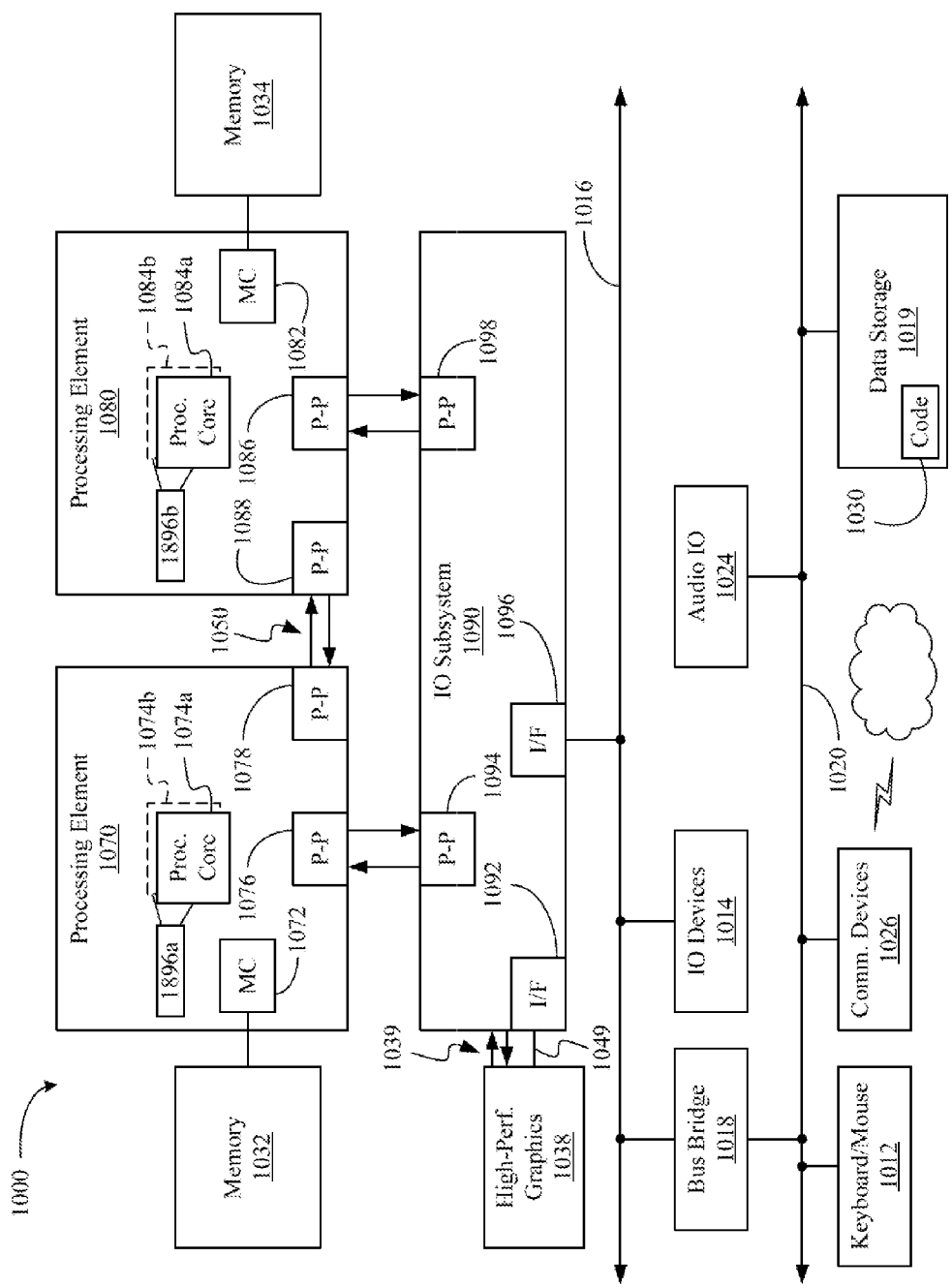
FIG. 6 is a block diagram of an example of a system according to an embodiment.

FIG. 6 shows a block diagram of a system 1000 in accordance with an embodiment. Shown in FIG. 6 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 5.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope is not so limited.

As shown in FIG. 6, various I/O devices 1014 such as the display 16 (FIGS. 1A and 1B) and/or the display 496 (FIG. 4) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the logic architecture 464 (FIG. 4), already discussed. Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

ADDITIONAL NOTES AND EXAMPLES

Examples may include subject matter such as an apparatus to animate an avatar, means for performing acts, or a machine readable medium including instructions that when performed by a machine causes the machine to perform acts related to animating an avatar in conjunction with a karaoke solution.

Example 1 may include subject matter such as an apparatus to animate an avatar. The apparatus may include an image capture device, a script module to provide script data to a user, a motion module to extract user facial motion data that corresponds to one or more user facial gestures, and/or an avatar module to animate an avatar based the user facial motion data.

Example 2 may include the subject matter of Example 1 and further optionally is to include extracting the user facial motion data that corresponds to one or more user facial gestures observed by the image capture device when the user utilizes the script data.

Example 3 may include the subject matter of any of Example 1 to Example 2 and further optionally is to include an image capture device that is to include a camera of a mobile platform.

Example 4 may include the subject matter of any of Example 1 to Example 3 and further optionally is to include observing one or more of the user facial gestures that are to occur in a visual field of the camera.

Example 5 may include the subject matter of any of Example 1 to Example 4 and further optionally is to include causing the motion module to extract source facial motion data that corresponds to a source object of the script data.

Example 6 may include the subject matter of any of Example 1 to Example 5 and further optionally is to include causing the avatar module to animate an avatar based on the source facial motion data.

Example 7 may include the subject matter of any of Example 1 to Example 6 and further optionally is to include causing the avatar module to provide an avatar selected by the user to be utilized as one or more of a user avatar and/or a source object avatar.

Example 8 may include the subject matter of any of Example 1 to Example 7 and further optionally is to include a tone module to recognize user audio to be captured by an audio capture device.

Example 9 may include the subject matter of any of Example 1 to Example 8 and further optionally is to include causing the tone module to convert the user audio to a predetermined tone.

Example 10 may include the subject matter of any of Example 1 to Example 9 and further optionally is to include a match module to analyze a degree of match between the user facial motion data and source facial motion data.

Example 11 may include the subject matter of any of Example 1 to Example 10 and further optionally is to include a compilation module to combine an avatar animation of a plurality of avatars into a same media content.

Example 12 may include the subject matter of any of Example 1 to Example 11 and further optionally is to include a communication module to communicate one or more of motion data, avatar data, script data, tone data, match data, or compilation data over a communication network.

Example 13 may include subject matter such as a method to animate an avatar. The method may include extracting user facial motion data that corresponds to one or more user facial gestures observed by an image capture device when a user emulates a source object, and/or animating an avatar based on the user facial motion data.

Example 14 may include the subject matter of Example 13 and further optionally may include providing script data to the user.

Example 15 may include the subject matter of any of Example 13 to Example 14 and further optionally may include extracting the user facial motion data when the user utilizes the script data.

Example 16 may include the subject matter of any of Example 13 to Example 15 and further optionally may include capturing one or more of the user facial gestures that occur in a visual field of a camera of a mobile platform.

Example 17 may include the subject matter of any of Example 13 to Example 16 and further optionally may include recognizing user audio captured by an audio capture device.

Example 18 may include the subject matter of any of Example 13 to Example 17 and further optionally may include providing script data including text.

Example 19 may include the subject matter of any of Example 13 to Example 18 and further optionally may include generating the user audio by a verbalization of the text by the user.

Example 20 may include the subject matter of any of Example 13 to Example 19 and further optionally may include converting the user audio to a predetermined tone.

Example 21 may include the subject matter of any of Example 13 to Example 20 and further optionally may include extracting source facial motion data that corresponds to the source object.

Example 22 may include the subject matter of any of Example 13 to Example 21 and further optionally may include animating an avatar based on the source facial motion data.

Example 23 may include the subject matter of any of Example 13 to Example 22 and further optionally may include extracting the source facial motion data from media content that may include one or more of a music video and/or an animated movie in which the user is absent.

Example 24 may include the subject matter of any of Example 13 to Example 23 and further optionally may include extracting the source facial motion data from the source object including one or more of a performer and/or a character in the media content.

Example 25 may include the subject matter of any of Example 13 to Example 24 and further optionally may include providing an avatar selected by the user to be utilized as one or more of a user avatar and/or a source object avatar.

Example 26 may include the subject matter of any of Example 13 to Example 25 and further optionally may include providing the avatar including an image of a source object.

Example 27 may include the subject matter of any of Example 13 to Example 26 and further optionally may include analyzing a degree of match between the user facial motion data and source facial motion data.

Example 28 may include the subject matter of any of Example 13 to Example 27 and further optionally may include determining the degree of match between user facial motion data of a plurality of users and the source facial motion data.

Example 29 may include the subject matter of any of Example 13 to Example 28 and further optionally may include assigning a value based on each degree of match.

Example 30 may include the subject matter of any of Example 13 to Example 29 and further optionally may include combining an avatar animation of a plurality of avatars into a same media content.

Example 31 may include the subject matter of any of Example 13 to Example 30 and further optionally may include one or more of storing and/or rendering the same media content including one or more combined avatar animations.

Example 32 may include the subject matter of any of Example 13 to Example 31 and further optionally may include communicating one or more of motion data, avatar data, script data, tone data, match data, and/or compilation data over a communication network.

Example 33 may include the subject matter of any of Example 13 to Example 32 and further optionally may include communicating motion data, avatar data, script data, tone data, match data, and/or compilation data in real-time.

Example 34 may include subject matter such as at least one computer-readable medium including one or more instructions that when executed on one or more computing devices causes the one or more computing devices to perform the method of any of Example 15 to Example 33.

Example 35 may include subject matter such as at least one apparatus including means for performing the method of any of Example 15 to Example 33.

Example 36 may include subject matter such as at least one system including means for performing the method of any of Example 15 to Example 33.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carry the meaning of "one or more" or "at least one". In addition, as used in this application and in the claims, a list of items joined by the terms "one or more of" and "at least one of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, the specification, and following claims.

We claim:

1. An apparatus to animate an avatar comprising:
an image capture device;
a script module to present script data to a user that is to include text taken from speech made in a performance by a source object in media content;
a motion module to extract user facial motion data that corresponds to one or more user facial gestures observed by the image capture device when the user is to utilize the script data to verbalize the text taken from the speech made in the performance by the source object, wherein the user is to emulate the source object when the source object in the media content speaks in the performance; and
an avatar module to animate an avatar based on the user facial motion data.

2. The apparatus of claim 1, wherein the image capture device is to include a camera of a mobile platform and one or more of the user facial gestures are to occur in a visual field of the camera.

3. The apparatus of claim 1, wherein the motion module is to extract source facial motion data that corresponds to the source object of the script data, and wherein the avatar module is to animate the avatar based on the source facial motion data.

4. The apparatus of claim 1, wherein the avatar module is to provide an avatar selected by the user to be utilized as one or more of a user avatar or a source object avatar.

5. The apparatus of claim 1, further including:
a tone module to recognize user audio to be captured by an audio capture device and to convert the user audio to a predetermined tone, wherein the predetermined tone is to include one or more of a tone of the user to be heard when an avatar for the source object is to be animated, a tone of the source object when an avatar for the user is to be animated, or a tone representative of an avatar type when the avatar for the source object or the avatar for the user is to be animated;
a match module to analyze a degree of match between the user facial motion data and source facial motion data that corresponds to one or more source object facial gestures when the source object in the media content speaks in the performance;
a compilation module to combine an avatar animation of a plurality of users into a same media content, wherein each user of the plurality of users is to emulate a corresponding source object when the corresponding source object in the media content speaks in the performance; and
a communication module to communicate one or more of motion data, avatar data, script data, tone data, match data, or compilation data over a communication network.

6. At least one computer-readable medium comprising one or more instructions that when executed on a computing device cause the computing device to:
present script data to a user that is to include text taken from speech made in a performance by a source object in media content;
extract user facial motion data that corresponds to one or more user facial gestures observed by an image capture device when the user is to utilize the script data to verbalize the text taken from the speech made in the performance by the source object, wherein the user is to emulate the source object when the source object in the media content speaks in the performance; and
animate an avatar based on the user facial motion data.

7. The at least one medium of claim 6, wherein when executed the one or more instructions cause the computing device to capture one or more of the user facial gestures that are to occur in a visual field of a camera of a mobile platform.

8. The at least one medium of claim 6, wherein when executed the one or more instructions cause the computing device to recognize user audio captured by an audio capture device, wherein the user audio is to be generated by the verbalization of the text by the user, and to convert the user audio to a predetermined tone.

9. The at least one medium of claim 6, wherein when executed the one or more instructions cause the computing device to extract source facial motion data that corresponds to the source object of the script data and to animate the avatar based on the source facial motion data.

10. The at least one medium of claim 9, wherein when executed the one or more instructions cause the computing device to extract the source facial motion data from media content that includes one or more of a music video or an animated movie in which the user is absent, wherein the source object is to include one or more of a performer or a character in the media content.

11. The at least one medium of claim 6, wherein when executed the one or more instructions cause the computing device to provide an avatar selected by the user to be utilized as one or more of a user avatar or a source object avatar, wherein the avatar is to include an image of the source object.

12. The at least one medium of claim 6, wherein when executed the one or more instructions cause the computing device to analyze a degree of match between the user facial motion data and source facial motion data that corresponds to one or more source object facial gestures when the source object in the media content speaks in the performance.

13. The at least one medium of claim 12, wherein when executed the one or more instructions cause the computing device to determine the degree of match between user facial motion data of a plurality of users and the source facial motion data, wherein each user of the plurality of users is to emulate a corresponding source object when the corresponding source object in the media content speaks in the performance, and to assign a value based on each degree of match.

14. The at least one medium of claim 6, wherein when executed the one or more instructions cause the computing device to combine an avatar animation for a plurality of avatars into a same media content, wherein each user of a plurality of users is to emulate a corresponding source object when the corresponding source object in the media content speaks in the performance, and wherein the same media content is to be one of stored or rendered.

15. The at least one medium of claim 6, wherein when executed the one or more instructions cause the computing device to communicate one or more of motion data, avatar data, script data, tone data, match data, or compilation data in real-time.

16. A method to animate an avatar comprising:
presenting script data to a user that includes text taken from speech made in a performance by a source object in media content;
extracting user facial motion data corresponding to one or more user facial gestures observed by an image capture device when the user utilizes the script data to verbalize the text taken from the speech made in the performance by the source object, wherein the user emulates the source object when the source object in the media content speaks in the performance; and
animating an avatar based on the user facial motion data.

17. The method of claim 16, further including capturing one or more of the user facial gestures occurring in a visual field of a camera of a mobile platform.

18. The method of claim 16, further including:
recognizing user audio captured by an audio capture device, wherein the user audio is generated by the verbalization of the text by the user; and
converting the user audio to a predetermined tone.

19. The method of claim 16, further including:
extracting source facial motion data corresponding to the source object of the script data; and
animating the avatar based on the source facial motion data.

20. The method of claim 16, further including providing an avatar to be selected by the user to be utilized as one or more of a user avatar or a source object avatar.

21. The method of claim 16, further including analyzing a degree of match between the user facial motion data and source facial motion data corresponding to one or more source object facial gestures when the source object in the media content speaks in the performance.

22. The method of claim 16, further including combining an avatar animation of a plurality of avatars into a same media content, wherein each user of a plurality of users is to emulate a corresponding source object when the corresponding source object in the media content speaks in the performance, and wherein the same media content is one of stored or rendered.

23. The method of claim 16, further including communicating one or more of motion data, avatar data, script data, tone data, match data, or compilation data over a communication network.

* * * * *